Oct. 13, 1959

P. C. STEIN 2,908,516

CIRCUMFERENTIAL SHAFT SEAL

Filed Aug. 2, 1954

INVENTOR.
PHILIP CHARLES STEIN
BY
ATTORNEYS

Oct. 13, 1959 — P. C. STEIN — 2,908,516
CIRCUMFERENTIAL SHAFT SEAL
Filed Aug. 2, 1954 — 3 Sheets-Sheet 2

INVENTOR.
PHILIP CHARLES STEIN
BY
ATTORNEYS

*INVENTOR.*
PHILIP CHARLES STEIN
BY
ATTORNEYS

_United States Patent Office_

2,908,516
Patented Oct. 13, 1959

2,908,516

CIRCUMFERENTIAL SHAFT SEAL

Philip Charles Stein, Lansdowne, Pa., assignor, by mesne assignments, to Koppers Company, Inc., Pittsburgh, Pa., a corporation of Delaware Application August 2, 1954, Serial No. 447,276

7 Claims. (Cl. 286—22)

This invention relates to rubbing seals for preventing or restricting leakage of fluid between relatively movable parts, including rotating or reciprocating parts such as rotating shafts passing through the casings of turbines, centrifugal compressors and the like and other comparable applications.

For purposes of exemplifying the invention, it will be explained in the main by reference to its application as between a rotating shaft and a stationary housing member such as may be a part of a turbine or a rotary air compressor. But since the invention is based broadly on the principles of fluid flow past members sealing the space between relatively moving surfaces, the general considerations entering into its application as a seal for other relatively moving surfaces, reciprocating as well as rotating, are much the same as for seals on rotating shafts as hereinafter explained and, therefore, it is to be expressly understood that the invention is not limited to the embodiments selected to exemplify the invention.

Circumferential seals employing a sealing ring of metal, carbon or other suitable material held against the circumference of a shaft have heretofore received wide usage. In such applications the sealing ring is set in an annulus fashioned in the housing or on the shaft. Seals of this type have been used as piston rod packings of reciprocating steam engines and similar low speed machinery. In general, the nature of their design subjects them to high pressure loadings which at even moderate speeds are accompanied by abnormally high rates of wear and excessive power consumption because of friction. With high shaft speeds such as, for example, those encountered in aircraft jet engines, circumferential seals with high contact forces at the rubbing surfaces are not satisfactory. Furthermore, since the contact pressures must be low and substantially uniform, the methods of holding the rings become of great importance.

It is an object of this invention to provide a sealing device and method of constructing the same which avoid the aforesaid high contact pressures at the rubbing surface and will insure a low yet positive contact pressure at the rubbing surface.

Another object of this invention is to provide an improved sealing device that is highly effective in operation and in which power consumption and frictional heating are minimized.

Another object of this invention is to provide an improved sealing device which has inherently a long wear life even with high shaft speeds.

Another object of this invention is to provide an improved sealing device which can remain operable despite practically unlimited axial movement of the rotating shaft with respect to the casing parts of the machine.

It is a further object of this invention to provide an improved sealing device which can be adapted to fit a small annular space and which can be made very low in weight.

These and other objects of the invention will become apparent from the following description when read in conjunction with the accompanying drawings, in which.

Figure 1:
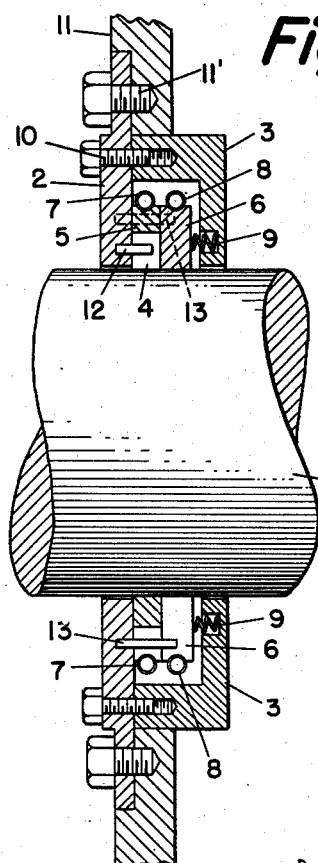
Figure 1 is an axial section of an embodiment of the invention.

Referring first to Figure 1, a shaft 1 is surrounded by a casing comprising a casing plate 2 and an angle-shaped part 3 bolted together by an annular array of screws 10. The casing is attached to a machine housing 11 by an annular array of screws 11' passing through the outer portion of the plate 2. The casing parts 2 and 3 form an annular groove in which are disposed three segmented rings 4, 5 and 6 of rectangular cross section. In most applications, carbon rings are preferably employed. However, various materials may be substituted for the carbon in various specific applications. The ring 5 is disposed radially outwardly around the ring 4 and the ring 6 is disposed axially of the rings 4 and 5 and has radial dimensions approximately equal to the combined radial dimensions of the rings 4 and 5. The rings 4 and 5 are held against the shaft 1 by an external garter spring 7. The ring 6 is held against the shaft by an external garter spring 8. The rings 4 and 5 are urged into engagement with the adjacent face of the casing plate 2 by an annular array of springs 9 extending in an axial direction between the casing part 3 and the ring 6. The segments of the rings 4, 5 and 6 are so arranged that the gaps 17 between the segments of the ring 4 are covered by segments of the rings 5 and 6 so that there will be no gap leakage. The ring assembly is restrained from rotating with the shaft 1 by pins 12 and 13 mounted in the plate 2, the pins 12 passing into the gap spaces 17 between the segments of the rings 4, and the pins 13 passing into the gap spaces 18 and 19 between segments of the rings 5 and 6, respectively.

Figure 2:
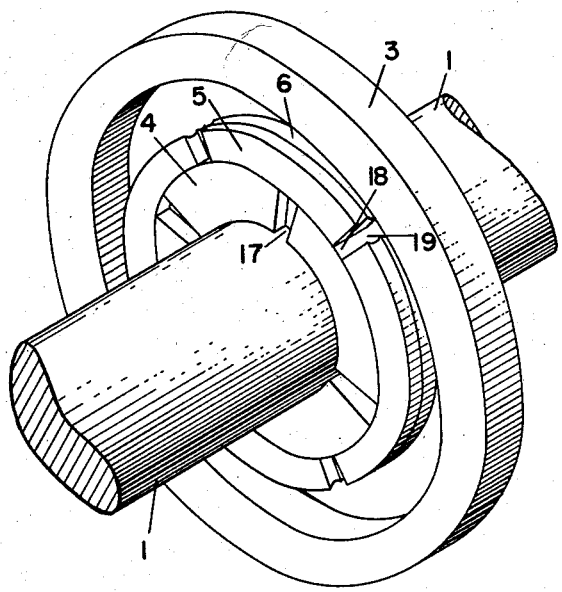
Figure 2 is a perspective of the apparatus shown in Figure 1 with some of the parts removed.

Figure 2 is a perspective view of the embodiment shown in Figure 1 with the casing plate 2 and the garter springs 7 and 8 omitted. From Figure 2 it will be seen that the gaps 17 between the segments of the ring 4 are covered by the inner arcuate surfaces of the segments of the ring 5 and the radial faces of the segments of the ring 6 which contact the ring 4.

Figure 3:
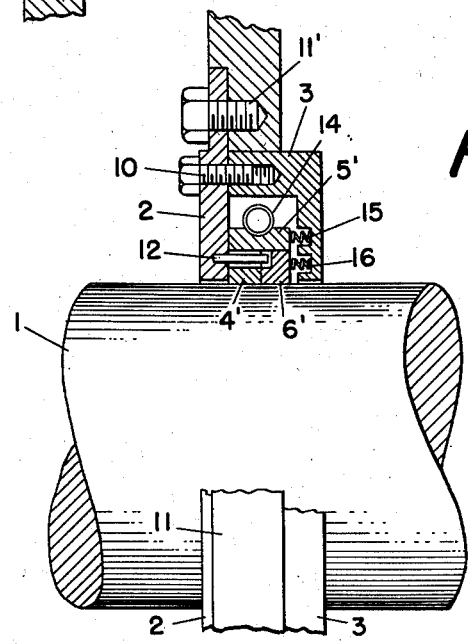
Figure 3 is a fragmentary section of an alternative arrangement of the invention shown in Figure 1.

Figure 3 shows an alternative arrangement of the rings 4, 5 and 6, shown in Figure 1, in which rings 4', 5' and 6' are arranged with rings 4' and 6' lying adjacent to each other on the surface of the shaft and the ring 5' extending around the outer surface and for the total axial length of the two rings 4' and 6'. In the arrangement shown in Figure 3, only one external garter spring 14 is necessary. Two sets of axial springs 15 and 16 are employed in order to maintain the ring 5' and the ring 4' in engagement with the casing plate 2.

Figure 4:
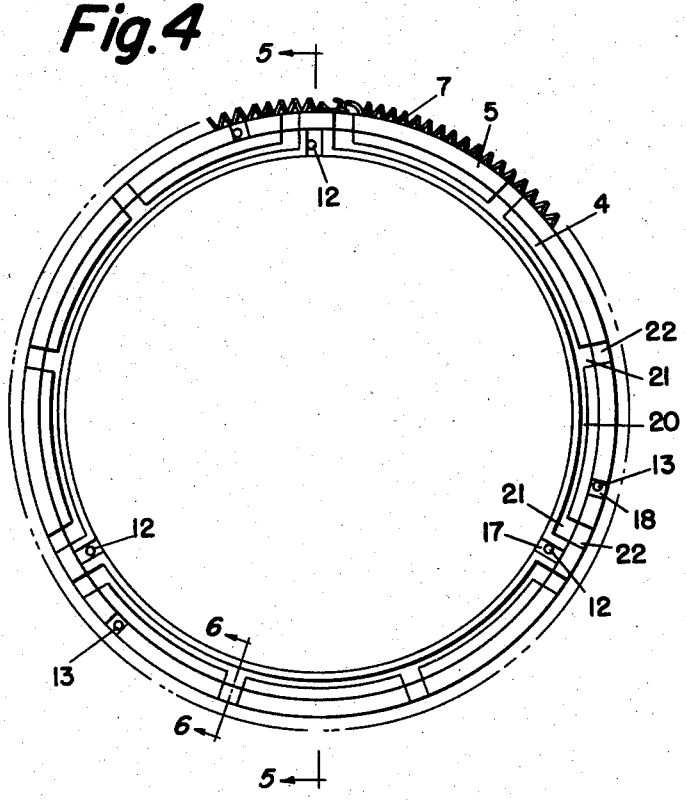
Figure 4 is an elevation of a portion of the apparatus shown in Figure 1.
Figure 5:
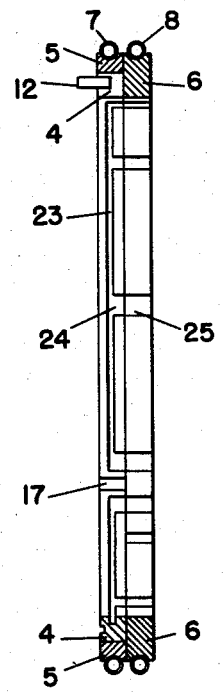
Figure 5 is a section taken on the trace 5—5 shown in Figure 4.
Figure 6:
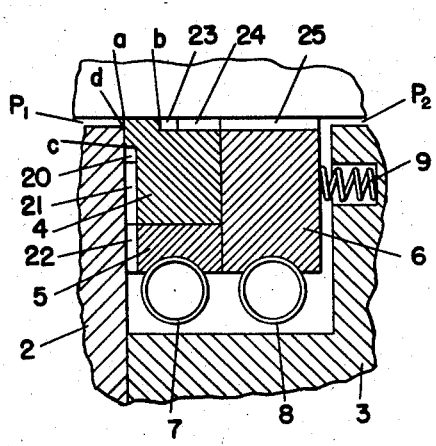
Figure 6 is a fragmentary section taken on the trace 6—6 shown in Figure 4, and includes a showing of additional parts of the apparatus.

Figures 4, 5 and 6 show in detail the grooving on the faces of the rings 4 and 5 adapted to engage the casing plate 2 and on the bores of the rings 4 and 6 adapted to engage the shaft 1. This grooving has as its function the reduction of pressure forces in the case of seals restricting gas flow and the reduction of hydrodynamic pressures in the case of seals functioning as oil seals. In Figure 4 there is shown a circumferentially extending groove 20 cut into the radial face of each of the segments of the ring 4 which make contact with the casing plate 2. These circumferential grooves 20 do not extend to the ends of each of the segments but terminate a short distance from the gap 17 between the segments. The grooves 20 are vented to the segments of the outer ring 5 by radial grooves 21 in the segments of the ring 4 and aligning radial grooves 22 in the segments of the ring 5. The grooves 21 and 22 are arranged to form continuations of one another.

On the inner arcuate faces of each of the segments of the ring 4 there is a circumferentially extending groove 23 which terminates a short distance from the gaps 17 and is vented through axially extending grooves 24 in the ring segments 4 and aligning axially extending grooves 25 in the ring segment 6 to the back of the ring assembly, i.e., the radial side away from the plate 2.

The function of the grooving can be understood by reference to Figure 6. Assuming that the pressure on the lefthand side of the figure is $P_1$, that the pressure on the righthand side of the figure is $P_2$, and that the pressure $P_2$ is higher than the pressure $P_1$, the clearance space between the parts 6 and 3 will allow the outer arcuate surfaces of the ring segments 5 and 6 to be subjected to pressure $P_2$ and the axial grooves 24 and 25 and the radial grooves 22 and 21 will allow the pressure $P_2$ to enter the circumferentially extending grooves 23 and 20, respectively, in the segments of the ring 4. Hence, there will be a gradient pressure from $P_2$ to $P_1$ and from the point marked $b$ in the circumferentially extending groove 24 to the point marked $a$ on the outer face of the ring 4, and from the point marked $c$ in the circumferentially extending groove 20 to the point marked $d$ on the exposed face of the ring 4. Thus all portions of the segments of the rings 4 and 6 will have the same pressure acting on their inner and outer arcuate surfaces except for that portion of ring 4 extending between $b$ and $a$ over which the pressure on the inner arcuate face is variable and is less than the pressure on the corresponding outer surfaces of the ring 5. Therefore, it is seen that the resultant pressure force is directed radially inwardly, increasing the contact force at rubbing surfaces of the ring segments 4 of the shaft 1. It will be understood that the smaller the distance between $b$ and $a$, the lower will be the resultant pressure force on the rubbing surface.

Similarly, there will be a gradient of pressure from $c$ to $d$ so that there will be a resultant axially directed pressure force due to the differential in pressure from $P_1$ to $P_2$ over the area extending from $d$ to $a$ and due to a variable fraction of this differential over the area extending from $c$ to $d$. This axially directed pressure force tends to increase the contact force between the segments of the ring 4 and the plate 2. The friction arising from this contact force tends to restrain the ring assembly from following eccentricities of the shaft with respect to the casing parts 2 and 3. Since the radial loadings of the rings should be kept low in order to keep the normal forces at the sliding surfaces within low magnitudes to insure long wearing life, it is also necessary to keep the axial loadings within low magnitudes to insure that the friction forces arising at the radially plane contact surfaces between ring segments and between the ring segments and the casing 2 do not exceed the radial loading and prevent the segments from following eccentricities of the shaft.

It will be apparent that in cases where the seal is subjected to reversals of pressure differential, i.e., in cases where the pressure at $P_1$ on the left side of Figure 6 is sometimes greater than the pressure $P_2$ on the right-hand side of Figure 6, reduction of the distance from $a$ to $b$ and from $b$ to $c$ will reduce the pressure forces tending to lift the seal from its contact with the shaft and from its contact with the casing part 2. These lifting forces which are due to the pressure differential between $P_1$ and $P_2$ act only over the surfaces represented by distances $a$ to $b$ and $a$ to $c$ over which the pressures would exceed the pressure $P_2$ whereas all other surfaces of the ring are subjected to pressure $P_2$ by reason of the grooving and venting. Inasmuch as these lifting pressure forces are opposed only by the axial springs 9 and the circumferential garter springs 7 and 8, minimizing the distances from $a$ to $b$ and from $a$ to $c$ will avoid the necessity of increasing these spring loadings on the ring segments to undesirable values.

In the case of oil seals, hydrodynamic forces occur at the rubbing interfaces. These forces consist of both viscous shear forces parallel to the direction of relative motion and pressure forces perpendicular to the rubbing surfaces. The pressure forces are generated in all instances where the rubbing surfaces do not mate with absolute trueness so that converging flow paths exist over some portions of the rubbing areas. The initial discrepancies in mating may be due to small deviations in the machining of the parts or to thermal or structural deformations during operation. The action of the hydrodynamic forces created by these initial deformations may cause further deformations so that the rubbing surfaces fail to make intimate contact over the entire circumference of the shaft and the seal will leak excessively. The use of the circumferential grooves in the bores of the rings 4 and 6 engaging the shaft will relieve the hydrodynamic forces. Obviously, such circumferential grooves can be made in multiple in cases where high rubbing velocities would tend to create hydrodynamic forces of high magnitude.

In the case of the use of seals for sealing oil or other liquids, since the interspace between the plate 2 and the rings 4 and 5 is of minute dimension, any motion of the rings 4 and 5 on the plate 2 is accompanied by high viscous shear forces. Since rapid response of the ring segments 4 and 5 to eccentricities of the shaft is necessary, these viscous forces must be kept at a low magnitude. This may be accomplished by reducing the contact area between the plate 2 and the segments of the rings 4 and 5 by widening the grooves 21 and 22 in the circumferential direction so that the bearing pads of only small dimension remain between adjacent grooves. Also, the circumferential grooves 20 may be widened by increasing their outer diameters to further reduce the remaining contact area.

To reduce the viscous drag between the segments of the ring 6 and the segments of the rings 4 and 5, a similar undercutting of the radial face of the ring 6 which bears against the segments of the rings 4 and 5 may be employed. However, those areas of the radial faces of the segments of the ring 6 which overlay the gaps between the ring segments 4 must not be undercut.

Figure 7:
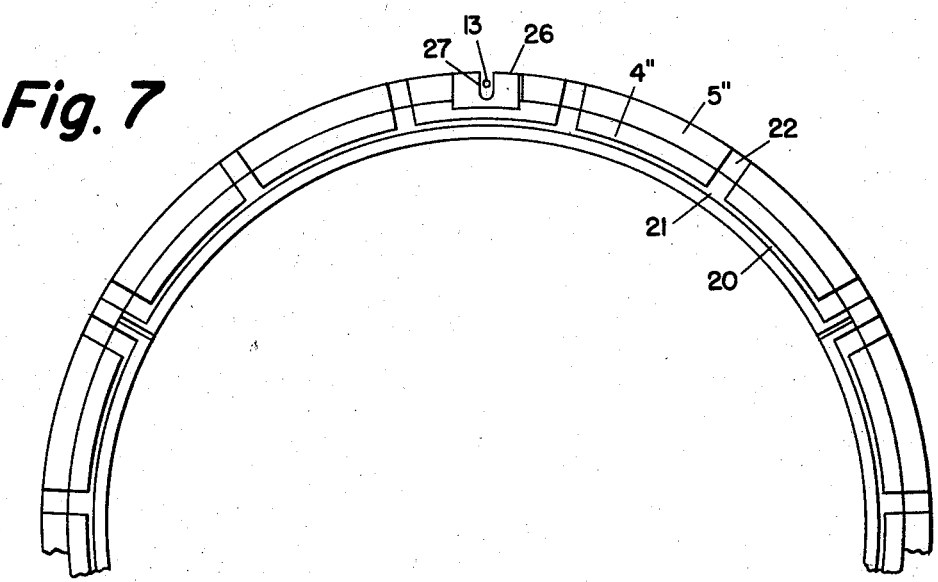
Figure 7 is an elevation of a portion of an alternative form of the apparatus shown in Figure 1.
Figure 8:
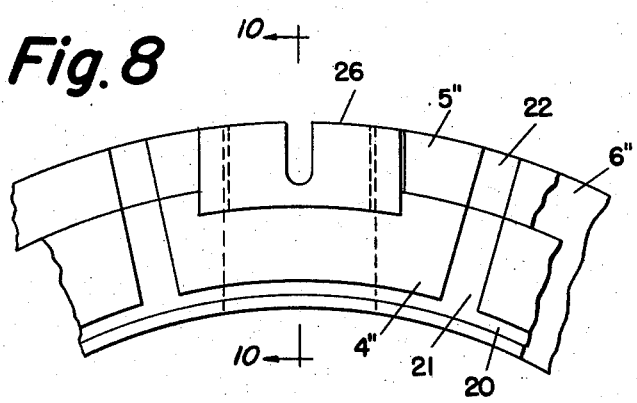
Figure 8 is an enlarged fragmentary portion of the parts shown in Figure 7.
Figure 9:
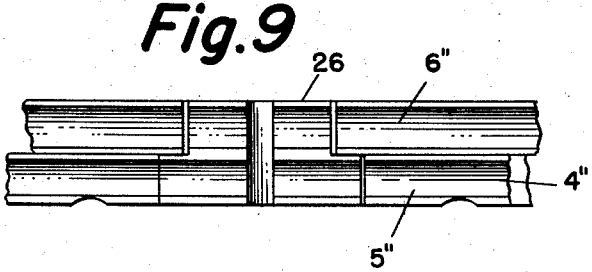
Figure 9 is a plan view of Figure 8.
Figure 10:
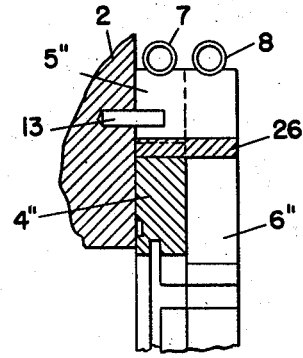
Figure 10 is a section taken on the trace 10—10 shown in Figure 8 and includes a fragmentary showing of an additional portion of the apparatus.

The circumferential friction force at the rubbing surfaces is of the nature of mechanical friction in the case of dry gas seals and of viscous friction in the case of seals for oil or other liquids. In both cases, this circumferential force causes compression in the segments of the rings 4 and 6 when the pin type of rotation lock, such as shown at 12 and 13 in Figure 4, is employed. This compression force in the curved ring segments tends to increase the degree of curvature of the segments so that the contact pressure in the segments becomes variable with respect to the circumferential length of the segment. To mitigate this effect, the ring segments are locked against rotation at some midposition with respect to their ends, as shown in Figure 7, and as will be hereinafter described. In this manner, advancing in the direction of shaft rotation, the part of the segment ahead of the lock will be compressed and the part of the segment behind the lock will be in tension so that variation in contact force at the rubbing surface is much reduced.

An embodiment of the invention incorporating this concept is shown in Figures 7–10 in which a ring 4″ is provided with a shallow notch on its outer arcuate face to receive a key insert 26 which may be made of brass, steel or any other suitable material. The key insert 26 is provided with a slot 27 which freely engages the pin 13 which is mounted in the plate 2 as previously described. The segments of the outer ring 5″, which are not subjected to any circumferential forces, may butt against the key insert 26 with sufficient clearance in their lengths to compensate for wear of the ring segments 4″ and for slight motion due to possible eccentricity between the shaft and the seal casing.

The key insert is of sufficient axial length that the ends of the ring segments 6″ butt against the insert in the same manner as the ends of the ring segments 5″. Obviously, the ring segments 6″ could, alternatively, be restrained by providing a notch in them for engaging the key insert 26 in the same manner as the ring segments 4″ engage the key insert.

It will be perceived that by the present invention a seal is provided which will insure a low, yet positive contact pressure at the relatively movable rubbing surfaces for a wide variety of conditions of operation and thereby only low power consumption and low frictional heat generation are involved. Furthemore, a seal has been provided which will allow for axial motion of the shaft with respect to the seal mounting.

While in the embodiment of the invention described herein the segmented rings are of circular form, it will be evident that in applications in which a non-circular shaft is involved the segments will be in the form of curved bars but will not necessarily by circular. Hereinafter, when the word "rings" is employed, it will be understood that they may be either circular or non-circular depending on the contour of the shaft or member with which they are to form a seal.

It will also be noted that while two arrangements of segmented rings have been disclosed, various alternative arrangements of segmented rings may be employed in conjunction with means for urging the rings toward one face of the retaining means and toward the surface of the member with which the seal is to be provided. A single segmented ring may conceivably be employed in which adjacent ends of the segments are connected by tongue and groove arrangements serving to prevent leakage from occurring between adjacent segments. Alternatively, an arrangement involving two segmented rings may be employed if the spaces between the segments of one ring corresponding to the ring 4 shown in Figure 1 are sealed by segments of a single L-shaped ring corresponding to the rings 5 and 6 shown in Figure 1. These two modifications have been found to be relatively unsatisfactorily due to the difficulty of machining the ring segments to the necessary degree of accuracy. This difficulty will be fully appreciated when it is noted that the end portions of the ring segments shown in Figures 1 and 3 are necessarily machined to accuracies of the order of .0001 inch.

It will, of course, be noted that various other modifications may be made to the details of the embodiment of the invention disclosed herein without departing from the scope of the invention as set forth in the following claims.

What is claimed is:

1. Apparatus for providing a seal along a rotatable shaft comprising a fixedly positioned seal casing having a surface normal to the longitudinal axis of said shaft, a first, second, and third sealing ring of which each of said sealing rings comprises a plurality of segments each having a side face, an inner face and an outer face, said first of said rings having said segment side face engageable with said normal surface and said segment inner face engageable with said shaft, said second ring overlying said first ring with said segments thereof arranged in staggered relation with said segments of said first ring and having said segment side engageable with said normal surface, said third ring overlying said first and second rings with said segments thereof being positioned in staggered relation with respect to the segments of said first ring, resilient means engaging said second and third rings for urging said inner and said side faces of said first ring into sealing contact with said normal surface and said shaft.

2. Apparatus for providing a seal along a rotatable shaft comprising a fixedly positioned seal casing having a surface normal to the longitudinal axis of said shaft, a first, second, and third sealing ring of which each of said sealing rings comprises a plurality of segments each having a side face, an inner face and an outer face, said first of said rings having said segment side faces engageable with said normal surface and said segment inner faces engageable with said shaft, said second ring overlying said first ring with said segments thereof arranged in staggered relation with said segments of said first ring and having said segmental sides engageable with said normal surface, said third ring overlying said first and second rings with said segments thereof being positioned in staggered relation with respect to the segments of said first ring, a first resilient means engaging said third ring for urging said segment side faces of said first and second rings into sealing contact with said normal surface, and a second resilient means engaging said second and third rings for urging said segment inner faces of said first and third segments into sealing contact with said shaft.

3. Apparatus for providing a seal along a rotatable shaft comprising a fixedly positioned seal casing having a surface normal to the longitudinal axis of said shaft, a first, second, and third sealing ring of which each of said sealing rings comprises a plurality of segments each having a side face, an inner face and an outer face, said first of said rings having segment side faces engageable with said normal surface and said inner faces thereof engageable with said shaft, said second ring overlying said first ring with said segments thereof arranged in staggered relation with said segments of said first ring and having said segment inner faces engageable with said shaft, said third ring overlying said first and second rings with said segments thereof being positioned in staggered relation with respect to the segments of said first ring, a first resilient means engaging said third ring for urging said inner faces of said first and second rings into sealing contact with said shaft, and a second resilient means engaging said second and third rings for urging said segment side faces of said first and third rings into sealing contact with said normal surface.

4. Apparatus for providing a seal along a rotatable shaft comprising a fixedly positioned seal casing having a surface normal to the longitudinal axis of said shaft, a first, second, and third sealing ring of which each of said sealing rings comprises a plurality of segments each having a side face, an inner face and an outer face, said first of said rings having said segment side faces engageable with said normal surface and said segment inner faces engageable with said shaft, said second ring overlying said first ring with said segments thereof arranged in staggered relation with said segments of said first ring and said segment sides engageable with said normal surface, said third ring overlying said first and second rings with said segments thereof being positioned in staggered relation with respect to the segments of said first ring, a first resilient means engaging said third ring for urging said segment side faces of said first ring into sealing contact with said normal surface each of said segment side and inner faces of said first ring being formed with a circumferential groove terminating at a distance from the ends thereof to provide relatively narrow sealing bands at the intersection of said inner and side faces, and radial venting grooves formed in said second and third ring segment and communicating with said circumferential grooves formed on said inner and side faces of said first ring segment.

5. Apparatus for providing a seal along a rotatable shaft comprising a fixedly positioned seal casing having a surface normal to the longitudinal axis of said shaft, a first, second, and third sealing ring of which each of said sealing rings comprises a plurality of segments each having a side face, an inner face and an outer face, said first of said rings having said segment side face engageable with said normal surface and said segment inner face engageable with said shaft, said second ring overlying said first ring with said segments thereof arranged in staggered relation with said segments of said first ring and having said segment side engageable with said normal surface, said third ring overlying said first and second rings with said segments thereof being positioned in staggered relation with respect to the segments of said first ring, resilient means engaging said second and third rings for urging said inner and said side faces of said first ring into sealing contact with said normal surface and said shaft, each of said segment side and inner faces of said first ring being formed with a circumferential groove terminating at a distance from the ends thereof so as to provide relatively narrow sealing bands at the intersection of said inner and side faces, and radial venting grooves formed in said second and third ring segments communicating with said circumferential grooves formed on said inner and side faces of said first ring segment.

6. Apparatus for providing a seal along a rotatable shaft comprising a fixedly positioned seal casing having a surface normal to the longitudinal axis of said shaft, a first, second, and third sealing ring of which each of said sealing rings comprises a plurality of segments each having a side face, an inner face and an outer face, said first of said rings having segment side faces engageable with said normal surface and said inner faces thereof engageable with said shaft, said second ring overlying said first ring with said segments thereof arranged in staggered relation with said segments of said first ring and having said segment sides engageable with said normal surface, said third ring overlying said first and second rings with said segments thereof being positioned in staggered relation with respect to the segments of said first ring, a first resilient means engaging said third ring for urging said inner surface of said first and second rings into sealing contact with said shaft, and a second resilient means engaging said second and third means for urging said segment side faces of said first and third rings into sealing contact with said normal surface, said segment side and inner faces of said first ring being formed with a circumferential groove terminating at a distance from the ends thereof so as to provide relatively narrow sealing bands at the intersection of said inner and side faces, and radial venting grooves formed in said second and third ring segments communicating with said circumferential grooves formed on said inner and side faces of said first ring segment.

7. The invention as defined in claim 1 in which the apparatus is provided with means for maintaining the adjacent ends of each of said ring segments spaced from each other comprising a pin means fixed on said casing, and elongate slots normal to said shaft axis formed in said ring segments intermediate the ends thereof to receive said pins.

References Cited in the file of this patent
UNITED STATES PATENTS

| | | |
|---|---|---|
| 674,325 | Walker | May 14, 1901 |
| 688,790 | Morris et al. | Dec. 10, 1901 |
| 774,886 | Magnusson | Nov. 15, 1904 |
| 1,828,178 | Fox | Oct. 20, 1931 |
| 1,891,436 | Michell | Dec. 20, 1932 |
| 1,999,094 | Gordon | Apr. 23, 1935 |
| 2,723,867 | Howard et al. | Nov. 15, 1955 |

FOREIGN PATENTS

| | | |
|---|---|---|
| 122,074 | Australia | Aug. 21, 1946 |